(12) United States Patent
Ruffini et al.

(10) Patent No.: US 11,444,713 B2
(45) Date of Patent: *Sep. 13, 2022

(54) TRANSMITTING RESIDENCE TIME INFORMATION IN A NETWORK

(71) Applicant: Telefonaktiebolaget LM Ericsson (publ), Stockholm (SE)

(72) Inventors: Stefano Ruffini, Pisa (IT); Eric Ward Gray, Pitman, NJ (US); Sriganesh Kini, San Jose, CA (US); Gregory Mirsky, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,945

(22) Filed: Jan. 21, 2020

(65) Prior Publication Data
US 2020/0162180 A1    May 21, 2020

Related U.S. Application Data

(63) Continuation of application No. 15/524,540, filed as application No. PCT/EP2015/074732 on Oct. 26, 2015, now Pat. No. 10,567,101.
(Continued)

(30) Foreign Application Priority Data

Nov. 21, 2014 (WO) .................. PCT/EP2014/075332

(51) Int. Cl.
*H04J 3/06* (2006.01)
*H04L 45/02* (2022.01)
*H04L 45/50* (2022.01)

(52) U.S. Cl.
CPC .......... *H04J 3/0667* (2013.01); *H04J 3/0658* (2013.01); *H04J 3/0673* (2013.01); *H04L 45/02* (2013.01); *H04L 45/50* (2013.01); *H04L 45/507* (2013.01)

(58) Field of Classification Search
CPC ....... H04J 3/0667; H04J 3/0658; H04L 45/02; H04L 45/50
See application file for complete search history.

(56) References Cited

U.S. PATENT DOCUMENTS 9,407,733 B1    8/2016  Mizrahi
10,567,101 B2 *  2/2020  Ruffini .................. H04L 45/507
(Continued)

FOREIGN PATENT DOCUMENTS

EP    2 461 501 A1    6/2012
EP    2461501 A1    6/2012
(Continued)

OTHER PUBLICATIONS

International Search Report and Written Opinion dated Jan. 25, 2016 for International Application Serial No. PCT/EP2015/074732, International Filing Date: Oct. 26, 2015 consisting of 9-pages.
(Continued)

*Primary Examiner* — Jael M Ulysse
(74) *Attorney, Agent, or Firm* — Christopher & Weisberg, P.A.

(57) ABSTRACT

A method of operation of a Multiprotocol Label Switching network involves, in an active node of the network, receiving a first data packet from a source node and forwarding the first data packet to a destination node. At the same time, the active node measures a residence time of the first data packet in the active node. The active node then sends a further data packet containing residence time information.

20 Claims, 4 Drawing Sheets

Related U.S. Application Data

(60) Provisional application No. 62/075,614, filed on Nov. 5, 2014.

(56) References Cited

U.S. PATENT DOCUMENTS

| | | | | |
|---|---|---|---|---|
| 2003/0016664 | A1* | 1/2003 | MeLampy | H04L 61/2557 370/389 |
| 2004/0196827 | A1* | 10/2004 | Xu | H04L 45/507 370/352 |
| 2006/0171346 | A1* | 8/2006 | Kolavennu | H04L 45/028 370/254 |
| 2007/0223537 | A1* | 9/2007 | Crowle | H04J 3/0667 370/503 |
| 2008/0031257 | A1* | 2/2008 | He | H04L 45/00 370/395.31 |
| 2008/0239969 | A1* | 10/2008 | He | H04L 69/14 370/392 |
| 2010/0085989 | A1* | 4/2010 | Belhadj | H04J 3/0667 370/503 |
| 2010/0085990 | A1* | 4/2010 | Belhadj | H04J 3/0667 370/517 |
| 2011/0051754 | A1* | 3/2011 | Lansdowne | H04J 3/0673 370/503 |
| 2011/0063988 | A1* | 3/2011 | Lee | H04L 41/5009 370/252 |
| 2011/0200051 | A1* | 8/2011 | Rivaud | H04J 3/0641 370/503 |
| 2011/0261706 | A1* | 10/2011 | Fujiwara | H04L 45/22 370/252 |
| 2013/0010600 | A1* | 1/2013 | Jocha | H04L 43/062 370/236.2 |
| 2013/0028265 | A1* | 1/2013 | Ronchetti | H04J 3/0697 370/400 |
| 2013/0034197 | A1* | 2/2013 | Aweya | H03L 7/0991 375/362 |
| 2013/0155945 | A1* | 6/2013 | Chen | H04J 3/0661 370/328 |
| 2014/0036936 | A1* | 2/2014 | Bui | H04J 3/0664 370/503 |
| 2014/0092922 | A1* | 4/2014 | Le Pallec | H04L 43/50 370/503 |
| 2014/0177653 | A1* | 6/2014 | Tzeng | H04J 3/0635 370/503 |
| 2014/0211780 | A1* | 7/2014 | Kang | H04W 76/10 370/350 |
| 2014/0294021 | A1 | 10/2014 | Jobert et al. | |
| 2015/0063375 | A1* | 3/2015 | Tzeng | H04J 3/0667 370/512 |
| 2015/0071309 | A1* | 3/2015 | Aweya | H04J 3/0664 370/503 |
| 2015/0171980 | A1* | 6/2015 | Bui | H04L 12/403 370/503 |
| 2016/0173267 | A1* | 6/2016 | Zhang | H04M 15/00 709/248 |
| 2017/0324497 | A1 | 11/2017 | Ruffini et al. | |

FOREIGN PATENT DOCUMENTS

| | | |
|---|---|---|
| JP | 2011176479 | 9/2011 |
| JP | 2011176479 A | 9/2011 |
| JP | 2014505444 | 2/2014 |
| JP | 2014507896 | 3/2014 |
| JP | 2017523841 A | 8/2017 |

OTHER PUBLICATIONS

International Search Report and Written Opinion dated Jun. 17, 2015 for International Application Serial No. PCT/EP2014/075332, International Filing Date: Nov. 21, 2014 consisting of 9-pages.

IEEE P1588 D2.2, Title: "Draft Standard for a Precision Clock Synchronization Protocol for Networked Measurement and Control Systems," Prepared by the Precise Networked Clock Synchronizaiton Working Group of th eIM/ST Committee, vol. 802,1, No. D2-2-0802, XP017637527, pp. 126-127, Feb. 2, 2008 consisting of 299-pages.

D. Mills et al., Title: "Network Time Protocol Version 4 Protocol and Algorithms Specification Internet Engineering Task Force (IETF)," Request for Comments: 5905, Obsoletes: 1305, 4330, Category: Standards Track, ISSN: 2070-1721 Jun. 2010 consisting of 110-pages.

S. Davari et al., Title: "Transporting Timing Messages over MPLS Networks, draft-ietf-tictoc-1588overmpls-06," TICTOC Working Group, Internet-Draft, Intended status: Experimental, Expires: Oct. 30, 2014 dated Apr. 28, 2014 consisting of 36-pages.

Japanese Office Action and English Translation dated Aug. 3, 2018 for Japanese Application No. 2017-523841, consisting of 7-pages.

Japanese Office Action with English Summary translation dated Sep. 14, 2020 for Japanese Patent Application No. 2019146687, consisting of 5-pages.

Extended European Search Report dated Nov. 11, 2020 for International Application No. 20186451.9, consisting of 8-pages.

Shen et al.; Clock Synchronization in T-MPLS Network via PTP (IEEE 1588 V2); Asia Communications and Photonics Conference and Exhibition; Nov. 2, 2009; Beijing, China, consisting of 8-pages.

Davar et al.; Transporting PTP Messages (1588) Over MPLS Networks; Draft-ietf-tictoc-1588overmpls-02; Oct. 7, 2011; Internet Engineering Task Force, IETF, consisting of 34-pages.

IEEE P1588 D2.2; Draft Standard for a Precision Clock Synchronization Protocol for Networked Measurement and Control Systems; Precise Networked Clock Synchronization Working Group of the IM/ST Committee, 2007, consisting of 299-pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 1|Version|   Reserved    |     Two-step RTM Channel      |
+-+-+-+-+-+-+-+-+-+-+-+-+-+-+-+-+-+-+-+-+-+-+-+-+-+-+-+-+-+-+-+-+
|                                                               |
|                          Scratch Pad                          |
+-+-+-+-+-+-+-+-+-+-+-+-+-+-+-+-+-+-+-+-+-+-+-+-+-+-+-+-+-+-+-+-+
| Flags |PTPType|                 Reserved                      |
+-+-+-+-+-+-+-+-+-+-+-+-+-+-+-+-+-+-+-+-+-+-+-+-+-+-+-+-+-+-+-+-+
|                           Port ID                             |
|                                                               |
|                               |-+-+-+-+-+-+-+-+-+-+-+-+-+-+-+-|
|                               |          Sequence ID          |
+-+-+-+-+-+-+-+-+-+-+-+-+-+-+-+-+-+-+-+-+-+-+-+-+-+-+-+-+-+-+-+-+
|            Type               |            Length             |
+-+-+-+-+-+-+-+-+-+-+-+-+-+-+-+-+-+-+-+-+-+-+-+-+-+-+-+-+-+-+-+-+
|                             Value                             |
~                                                               ~
|                                                               |
+-+-+-+-+-+-+-+-+-+-+-+-+-+-+-+-+-+-+-+-+-+-+-+-+-+-+-+-+-+-+-+-+ where Flags field has format
    +-+-+-+-+
    | Res.|S|
    +-+-+-+-+
```

Figure 4

TRANSMITTING RESIDENCE TIME INFORMATION IN A NETWORK

CROSS-REFERENCE TO RELATED APPLICATIONS

This Application is a continuation of U.S. application Ser. No. 15/524,540, filed May 4, 2017, entitled "TRANSMITTING RESIDENCE TIME INFORMATION IN A NETWORK," which is a submission under 35 U.S.C. § 371 for U.S. National Stage Patent Application of International Application Number: PCT/EP2015/074732, filed Oct. 26, 2015 entitled "TRANSMITTING RESIDENCE TIME INFORMATION IN A NETWORK," which claims priority to U.S. Provisional Application No. 62/075,614, filed Nov. 5, 2014, entitled "TRANSMITTING RESIDENCE TIME INFORMATION IN A NETWORK." U.S. application Ser. No. 15/524,540 is also related to and claims priority to PCT/EP2014/075332, filed Nov. 21, 2014, entitled "TRANSMITTING RESIDENCE TIME INFORMATION IN A NETWORK." The entireties of all of these Applications are incorporated herein by reference.

TECHNICAL FIELD

This invention relates to a telecommunications network, and in particular to a network using Multiprotocol Label Switching (MPLS). More specifically, the invention relates to transmitting residence time information in such a network.

BACKGROUND

In order to be able to achieve synchronization throughout a network, it is known to transmit timing information between network nodes. One example of a situation where this applies is the case of a cellular communications network, where it is necessary to achieve synchronization between the access points in the respective cells. One method of transmitting the timing information uses the Precision Time Protocol (PTP), and requires a node to measure a time at which it receives a message, and to measure a time at which it forwards that message on to a destination. The elapsed time between the two times is referred to as a residence time. Information about this residence time is sent to a destination node, for use in calculating transmission delays over the network, and thus for use in achieving synchronization between the nodes of the network.

Multiprotocol Label Switching (MPLS) is a mechanism used for transporting data packets across networks, and the document "Residence Time Measurement in MPLS network", Mirsky, et al, available at http://www.ietf.org/internet-drafts/draft-mirsky-mpls-residence-time-02.txt, describes a system in which Residence Time Measurement information can be transmitted in a Generic Associated Channel (G-ACh) message. Specifically, this document describes a system in which a data packet includes information indicating the residence time spent in routers transited by the packet on its path from an ingress router to an egress router.

However, this system places certain requirements on the hardware, and it may not be possible to meet these requirements in all cases.

SUMMARY

According to a first aspect of the invention, there is provided a method of operation of a Multiprotocol Label Switching network. An active node of the network receives a first data packet from a source node; forwarding the first data packet to a destination node; measures a residence time of the first data packet in the active node; and sends a further data packet containing residence time information.

The first data packet may be sent as part of a method for synchronization by two-way exchange of packets carrying timing information, for example as part of a method for synchronization by two-way exchange of packets carrying timing information, according to the Precision Time Protocol, PTP, or according to the Network Time Protocol, NTP.

The method may comprise including in said further data packet information identifying the first data packet.

Sending the further data packet containing residence time information may comprise:
  receiving a second data packet from the source node;
  forwarding the second data packet to the destination node; and
  including the residence time information in the second data packet forwarded to the destination node.

In some examples, sending the further data packet containing residence time information comprises: receiving a second data packet from the source node; including the residence time information in the second data packet; and forwarding the second data packet to the destination node.

In some examples, the source node is a clock operating in a two-step mode; and wherein the first data packet is sent as part of a method for synchronization, and the synchronization is based on a timestamp of transmission and/or receipt of the first data packet.

Sending the further data packet containing residence time information may comprise:
  receiving a second data packet from the destination node;
  forwarding the second data packet to the source node; and
  including the residence time information in the second data packet forwarded to the source node.

In some examples, sending the further data packet containing residence time information comprises: receiving a second data packet from the destination node; including the residence time information in the second data packet, and forwarding the second data packet to the source node.

Sending the further data packet containing residence time information may comprise:
  creating a new data packet;
  including the residence time information in the new data packet; and
  sending the new data packet to the destination node.

In some examples, the source node is a clock operating in a one-step mode; and wherein the first data packet is sent as part of a method for synchronization, and the synchronization is based on a timestamp of transmission and/or receipt of the first data packet.

The method may further comprise setting a flag in the forwarded first data packet to indicate that two-step mode is being used.

In some examples, sending the further data packet containing residence time information comprises: creating a new data packet; including the residence time information in the new data packet; and sending the new data packet to the source node.

In some examples, the source node comprises a boundary clock or a clock connected to a boundary clock.

The method may further comprise updating a correction field in the further data packet to include said residence time information.

The further data packet may be encapsulated into a Generic Associated Channel packet. According to a second aspect of the invention, there is provided a method of operation of a Multiprotocol Label Switching network, wherein the Multiprotocol Label Switching network comprises a plurality of Label Switching Router nodes including a plurality of Label switching Edge Router nodes. The method comprises: transmitting a Sync data packet across the Multiprotocol Label Switching network from an ingress Label switching Edge Router to an egress Label switching Edge Router; transmitting a Follow_up data packet across the Multiprotocol Label Switching network from the ingress Label switching Edge Router to the egress Label switching Edge Router; and further comprises: measuring a residence time of the Sync data packet at each Label Switching Router node transited by the Sync data packet; and including updated residence time information, derived from the measured residence times, when transmitting the Follow_up data packet from each Label Switching Router node transited by the Sync data packet.

The method may further comprise: transmitting a Delay_Req data packet across the Multiprotocol Label Switching network from the egress Label switching Edge Router to the ingress Label switching Edge Router; transmitting a Delay_Resp data packet across the Multiprotocol Label Switching network from the ingress Label switching Edge Router to the egress Label switching Edge Router; measuring a residence time of the Delay_Req data packet at each Label Switching Router node transited by the Delay-Req data packet; and including updated residence time information, derived from the measured residence times of the Delay_Req data packet, when transmitting the Delay_Resp data packet from each Label Switching Router node transited by the Delay_Req data packet.

The method may comprise transmitting the data packets across the Multiprotocol Label Switching network in respective Generalized Associated Channel messages.

According to a third aspect of the invention, there is provided a Multiprotocol Label Switching, MPLS, network node, being configured for receiving a first data packet from a source node; and forwarding the first data packet to a destination node. A residence time of the first data packet in the active node is measured; and a further data packet is sent containing residence time information.

In some examples, the node is further configured for including in said further data packet information identifying the first data packet.

In some examples, the node is further configured for sending the further data packet containing residence time information by: receiving a second data packet from the source node; forwarding the second data packet to the destination node; and including the residence time information in the second data packet forwarded to the destination node.

In some examples, the node is further configured for sending the further data packet containing residence time information by: receiving a second data packet from the destination node; forwarding the second data packet to the source node; and including the residence time information in the second data packet forwarded to the source node.

In some examples, the node is further configured for sending the further data packet containing residence time information by: creating a new data packet; including the residence time information in the new data packet; and sending the new data packet to the destination node.

In some examples, the node is configured for setting a flag in the forwarded first data packet to indicate that two-step mode is being used.

In some examples, the node is configured for updating a correction field in the further data packet to include said residence time information.

In some examples, the further data packet is encapsulated into a Generic Associated Channel packet.

In a fourth aspect, a node is a Multiprotocol Label Switching, MPLS, network node, comprising: a processor; and a memory, said memory containing instructions executable by said processor. Said node is operative to: receive a first data packet from a source node; forward the first data packet to a destination node; measure a residence time of the first data packet in the active node; and send a further data packet containing residence time information.

BRIEF DESCRIPTION OF THE DRAWINGS

FIG. 4 illustrates a packet format.

DETAILED DESCRIPTION

Figure 1:
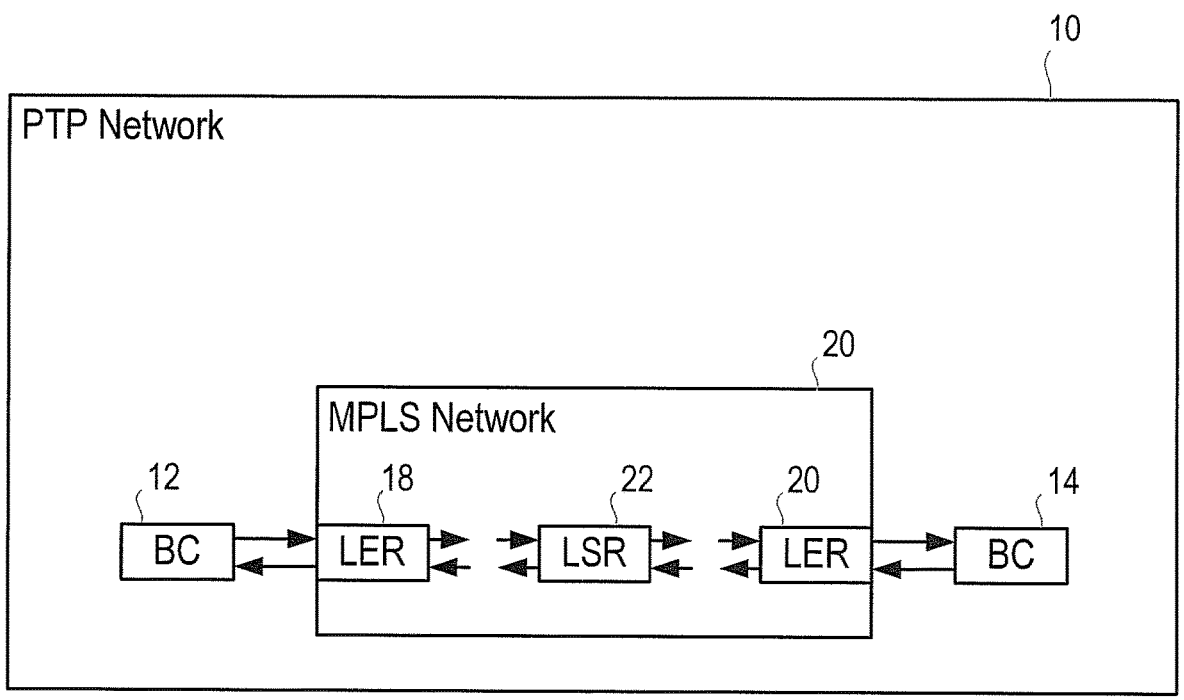
FIG. 1 shows a part of a network operating in accordance with an embodiment described herein.

FIG. 1 shows a part of a network, as an example of a network implementing the method described herein. It will be appreciated that the form of the network may be different and, in any event, FIG. 1 only shows a small part of the network, sufficient for an understanding of the method.

Thus, FIG. 1 shows an Internet Protocol (IP) network 10, in which the Precision Time Protocol (PTP) is used to distribute timing reference signals between network nodes. In the illustrated section of the network 10, there are two boundary clock (BC) nodes 12, 14. The method described herein is also suitable for use in other methods for synchronization by two-way exchange of messages, such as the Network Time Protocol (NTP). References to a node being a clock includes the node comprising a clock of functioning as a clock.

One illustrated part 16 of the network 10 operates using Multiprotocol Label Switching (MPLS). In a traditional IP network, packets are transmitted with an IP header that includes a source and destination address. A packet has no predetermined path and is being forwarded from one node to another in a hop-by-hop way. In contrast, in an MPLS network, a path, referred as Label Switched Path (LSP), can be established beforehand to force the packet to follow the specific path through the set of Label Switching Routers (LSRs). The ingress Label switching Edge Router (LER) encapsulates the packet with the MPLS header and forwards it according to the predetermined path. The egress LER decapsulates the MPLS packet and processes it as required.

The illustrated MPLS network 16 includes two Label switching Edge Routers (LERs) 18, 20, and one other Label Switching Router (LSR) 22.

In this illustrated example, the LERs 18, 20 are connected to the boundary clock (BC) nodes 12, 14, respectively. However, in other cases, for example, the MPLS network 16 is connected to one or more transparent clock node, that is itself connected to a boundary clock node.

Figure 2:
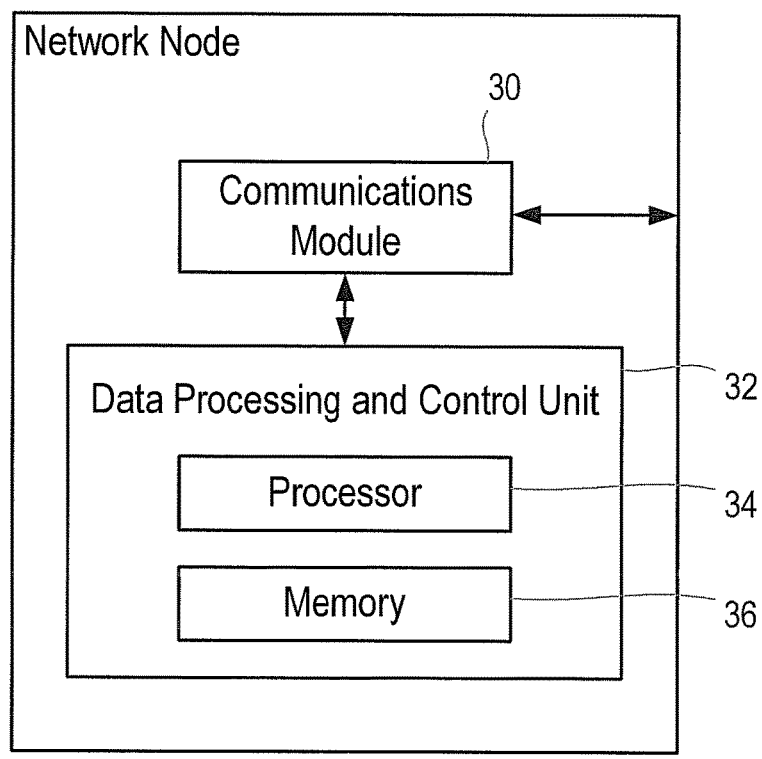
FIG. 2 illustrates a node in the network of FIG. 1.

FIG. 2 illustrates the form of each of the network nodes 18, 20, 22. Specifically, each node includes a communications module 30, for communicating with other network nodes. Each node also includes a data processing and control unit 32, including a processor 34 and a memory 36. The memory 36 can contain data and can also contain a program, containing instructions for execution by the processor, to cause the processor to perform the methods described herein.

Figure 3:
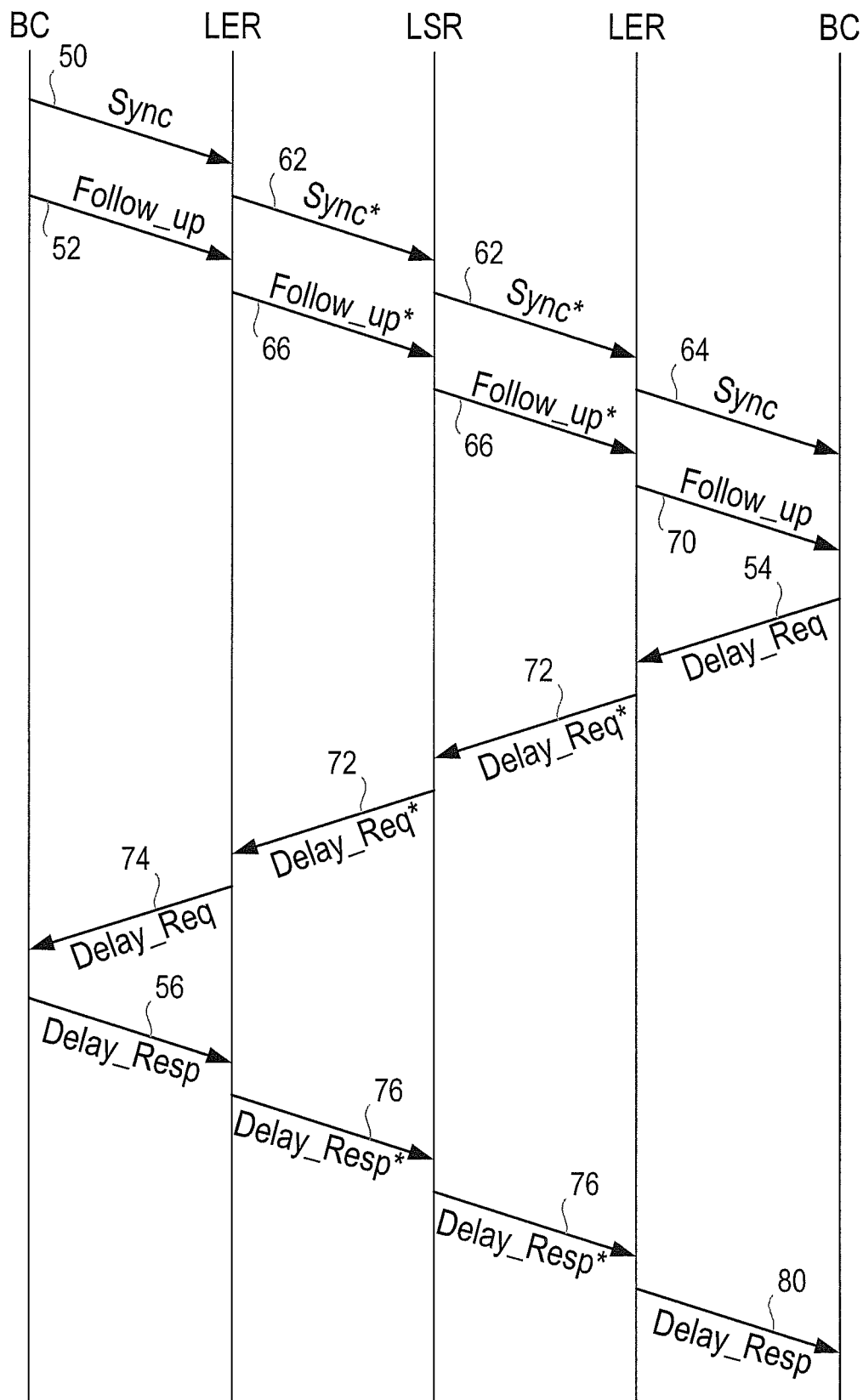
FIG. 3 is a timing diagram illustrating a first method.

FIG. 3 illustrates a method in accordance with a first embodiment.

Specifically, in this illustrated embodiment, at least one node of the PTP network 10 shown in FIG. 1 is operating in a 2-step mode. That is, a first boundary clock node, such as the boundary clock node 12 shown in FIG. 1, transmits an event PTP message in the form of a Sync message 50, and then sends a general PTP message, in the form of a Follow_up message 52.

On receipt of the Follow_up message 52, a second boundary clock node, such as the boundary clock node 14 shown in FIG. 1, transmits an event PTP message in the form of a Delay_Req message 54.

When it receives the Delay_Req message 54, the first boundary clock node 12 returns a general PTP message, in the form of a Delay_Resp message 56.

On receipt of the Delay_Resp message 54, the second boundary clock node 14 is able to obtain the required information about the transmission delays across the network, and thereby achieve synchronization with the first boundary clock node 12.

Thus, the method allows for synchronization by two-way exchange of packets carrying timing information.

In this embodiment, the Sync message 50, Follow_up message 52, Delay_Req message 54, and Delay_Resp message 56 are transmitted across the MPLS network in an MPLS message format, as shown in FIG. 4.

More specifically, in this embodiment, the data packets are transmitted across the MPLS network as a Generalized Associated Channel (G-Ach) message.

In the packet format shown in FIG. 4, the Version field is set to 0, as defined in RFC 4385 [RFC4385]. The Reserved field is set to 0 on transmit and ignored on receipt. The RTM Channel field identifies the packet as such.

The Flags field has one bit, S, which acts as a step flag, indicating if the two-step clock procedure is in use, and therefore set to 0 if the boundary clocks 12, 14 are operating in one-step mode, and set to 1 if they are operating in two-step mode. The PTPType field indicates the type of PTP packet carried in the TLV. One-step mode refers to no "follow_up" type message containing a transmission and/or receipt timestamp of an earlier event message for which time of transmission and/or receipt is directly used for synchronization. Two-step mode indicates there is a further message containing a transmission and/or receipt timestamp of an earlier event message for which time of transmission and/or receipt is directly used for synchronization.

Thus, for example, the PTPType field identifies whether the message is a Sync message, Follow_up message, Delay_Req message, or Delay_Resp message. The 10 octet long Port ID field contains the identity of the source port, that is, the specific PTP port of the boundary clock connected to the MPLS network. The Sequence ID is the sequence ID of the PTP message carried in the Value field of the message. Thus, a further packet, containing residence time information relating to an earlier packet, contains information identifying that earlier packet.

The Type field identifies the type of Value that the TLV carries, that is, the kind of field that the message represents. Thus, for example, the Type field can indicate that the message being carried is a message in the format described herein, that is able to carry residence time information. Different Type values may be used to indicate, for example, an authentication type of the carried PTP message. Thus, the type field may indicate that there is no payload, or may indicate that the payload is a PTPv2 message or an NTP message.

The Length field is number of octets of the Value field. The optional Value field may then be used to carry a packet of the time synchronization protocol being used. Thus, the Sync message, Follow_up message, Delay_Req message, or Delay_Resp message may be inserted in the Value field by the respective LER 18, 20 that is connected to the boundary clock node 12, 14 from which the relevant message is being sent.

The packet may be authenticated or encrypted and carried over the MPLS network edge to edge unchanged.

Thus, FIG. 3 shows the Sync message 50 being sent from the boundary clock node 12 to the MPLS ingress Label switching Edge Router (LER) 18. The LER 18 puts the message into the MPLS G-Ach format as shown in FIG. 4, and the resulting packet 62, indicated in FIG. 3 as Sync*, is transmitted through one or more Label Switching Router (LSR) 22, until it reaches the MPLS egress Label switching Edge Router (LER) 20. The LER 20 extracts the message from the MPLS format, and the resulting packet 64, corresponding to the original Sync message, is transmitted to the boundary clock node 14.

FIG. 3 also shows the Follow_up message 52 being sent from the boundary clock node 12 to the MPLS ingress Label switching Edge Router (LER) 18. Again, the LER 18 puts the message into the MPLS G-Ach format as shown in FIG. 4, and the resulting packet 66, indicated in FIG. 3 as Follow_up*, is transmitted through one or more Label Switching Router (LSR) 22, until it reaches the MPLS egress Label switching Edge Router (LER) 20.

However, in this case, each Label switching Edge Router (LER) 18, 20, and each Label Switching Router (LSR) 22, makes use of the Scratch Pad field of the packet format shown in FIG. 4, to include residence time information.

Specifically, the Scratch Pad field is 8 octets in length and, in the case of the Follow_up* message 66, is used to accumulate the residence time spent in LERs LSRs transited by the Sync packet on its path from the ingress LSR 18 to the egress LSR 20.

That is, when the ingress LER 18 transmits the Follow_up* message 66, it includes in the Scratch Pad field a value indicating the residence time spent in the LER 18 by the Sync message. The residence time may be measured in any convenient manner, for example from the point in time at which the message starts to be received until the point in time at which the message starts to be transmitted.

The time is stored in IEEE double precision format, with units of nanoseconds.

Similarly, when the LSR 22 transmits the Follow_up* message 66, it updates the Scratch Pad field by adding a value indicating the residence time spent in the LSR 22 by the Sync message.

This continues until the Follow_up* message 66 reaches the MPLS egress LER 20, which extracts the message from the MPLS G-Ach format, and sends a conventional Follow_up message 70 to the boundary clock node 14, containing information indicating the accumulated residence time of the Sync message across the nodes of the network transited by the message, including the egress LER 20 itself.

Each of the nodes 18, 20, 22 therefore receives a data packet containing the Sync message from a preceding, or source, node, and forwards it to a succeeding, or destination, node, and measures the residence time of the data packet in the respective node. Each of the nodes 18, 20, 22 subsequently sends a further data packet (i.e. the data packet containing the Follow-up message) to the succeeding, or destination, node, that includes residence time information derived from the measured residence time. The LER 18 is configured to generate the further data packet (follow-up*) in a two-step operation mode.

The further data packet comprises residence time information for the MPLS network and the received follow-up message from outside of the MPLS network 16, e.g. from the node 12. In this case, the sending of a further data packet containing the residence time information is achieved by forwarding a second message (second data packet) from the source to the destination, and including the residence time information in that forwarded second message. Thus, the further data packet sent is the second data packet. The second data packet was received from the previous node in the path, the residence time included, updated or modified to indicate the residence time in that node, and then the second data packet forwarded with the residence time information as the further data packet to the next node in the path.

Thus, each of the nodes 18, 22, 20 acts as a two-step transparent clock.

Thus, when considering the LER 18 as the active node, it receives the Sync message as a first packet from the boundary clock node 12 acting as a source node, and forwards the Sync message to a destination node, for example the LSR 22. (Thus, the term "source node" refers to the node from which the active node receives packets, and the term "destination node" refer to the node to which the active node sends packets. These may not be the original source or the ultimate destination of the packets.) The LER 18 then sends a further packet, namely the Follow_up* message 66 containing residence time information, to the destination node.

When considering the LSR 22 as the active node, it receives the Sync message as a first packet from a source node such as the LER 18, and forwards the Sync message to a destination node, for example the LER 20. It then sends a further packet, namely the Follow_up* message 66 containing residence time information, to the destination node.

The active node may be considered as the specific node that is performing the method steps, e.g. receiving and forwarding data packets, and for which a measurement of residence time in the node is made and included in a forwarded packet.

Similarly, when considering the LER 20 as the active node, it receives the Sync message as a first packet from a source node such as the LSR 22, and forwards the Sync message to a destination node, for example the boundary clock node 14. It then sends a further packet, namely the Follow_up message 70 containing residence time information, to the destination node. In some examples, the source node and/or destination node is a boundary clock or connected to a boundary clock, e.g. a transparent clock connected to a boundary clock.

When the boundary clock node 14, which is operating in two-step mode, receives the Follow_up message 70, it returns a Delay_Req message, as specified in IEEE 1588. Thus, FIG. 3 shows the Delay_Req message 70 being sent from the boundary clock node 14 to the MPLS Label switching Edge Router (LER) 20. The LER 20 puts the message into the MPLS G-Ach format as shown in FIG. 4, and the resulting packet 72, indicated in FIG. 3 as Delay_Req*, is transmitted through one or more Label Switching Router (LSR) 22, until it reaches the Label switching Edge Router (LER) 18. The LER 18 extracts the message from the MPLS G-Ach format, and the resulting packet 74, corresponding to the original Delay_Req message 54, is transmitted to the boundary clock node 12.

Again as specified in IEEE 1588, the boundary clock node 12, operating in two-step mode, returns a Delay_Resp message 56 when it receives the Delay_Req message 70. Thus, FIG. 3 shows the Delay_Resp message 56 being sent from the boundary clock node 12 to the Label switching Edge Router (LER) 18. Again, the LER 18 puts the message into the MPLS G-Ach format as shown in FIG. 4, and the resulting packet 76, indicated in FIG. 3 as Delay_Resp*, is transmitted through one or more Label Switching Router (LSR) 22, until it reaches the Label switching Edge Router (LER) 20.

The Delay_Resp* packet 76 contains the Delay_Resp message 56 as its payload, but also makes use of the Scratch Pad field of the packet format shown in FIG. 4, to include residence time information relating to the residence time of the respective Delay_Req message.

Each Label switching Edge Router (LER) 18, 20, and each Label Switching Router (LSR) 22 updates the Delay_Resp* packet 76 to include residence time information. In this case, the residence time information included in the Delay_Resp* packet 76 relates to the residence time spent in the LERs and LSRs by the Delay_Req message.

That is, in the case of the Delay_Resp* message 76, the Scratch Pad field is used to accumulate the residence time spent in the LERs 18, 20 and the LSR 22 by the Delay_Req packet on its path from the LER 20 to the LER 18.

In more detail, when the LER 18 generates and transmits the Delay_Resp* message 76, it includes in the Scratch Pad field a value indicating the residence time spent in the LER 18 by the respective Delay_Req message. As before, the residence time may be measured in any convenient manner, for example from the point in time at which the message starts to be received until the point in time at which the message starts to be transmitted.

The time is stored in IEEE double precision format, with units of nanoseconds.

Similarly, when the LSR 22 transmits the Delay_Resp* message 76, it updates the Scratch Pad field by adding a value indicating the residence time spent in the LSR 22 by the previous, related, Delay_Req message.

This continues until the Delay_Resp* message 76 reaches the LER 20, which extracts the message from the MPLS G-Ach format, and sends a conventional Delay_Resp message 80 to the boundary clock node 14, containing information indicating the accumulated residence time of the Delay-Req message across the nodes of the network transited by the Delay-Req message, including the egress LER 20 itself.

Each of the nodes 18, 20, 22 therefore receives a data packet containing the Delay_Req message from a preceding, or source, node, and forwards it to a succeeding, or destination, node, and measures the residence time of the data packet in the respective node. Each of the nodes 18, 20, 22 subsequently sends a further data packet (i.e. the data packet containing the Delay_Resp message) to the preceding, or source, node, that includes residence time information derived from the measured residence time. In this case, the sending of a further data packet containing the residence time information is achieved by forwarding a second message (second data packet) from the destination to the source, and updating or including the residence time information in that forwarded second message. The forwarded message or packet may be modified by the node that has received and forwarded the message. For example, the modification may be an inclusion or updating of the residence time information, in particular, to include the residence time spent in that node.

Thus, each of the nodes 18, 22, 20 acts as a two-step transparent clock.

Thus, when considering the LER 20 as the active node, it receives the Delay_Req message as a first packet from the boundary clock node 14 acting as a source node, and forwards the Delay_Req message to a destination node, for example the LSR 22. (Thus, the term "source node" refers to the node from which the active node receives packets, and the term "destination node" refer to the node to which the active node sends packets. These may not be the original source or the ultimate destination of the packets.) The LER 22 subsequently sends a further packet, namely the Delay_Resp message 118 containing residence time information, to the source node.

When considering the LSR 22 as the active node, it receives the Delay_Req* message as a first packet from a source node such as the LER 20, and forwards the Delay_Req* message to a destination node, for example the LER 18. It then sends a further packet, namely the Delay_Resp* message 76 containing residence time information, to the source node.

Similarly, when considering the LER 18 as the active node, it receives the Delay_Req* message as a first packet from a source node such as the LSR 22, and forwards the Delay_Req message to a destination node, for example the boundary clock node 12. It then sends a further packet, namely the Delay_Resp* message 76 containing residence time information, to the source node.

Figure 5:
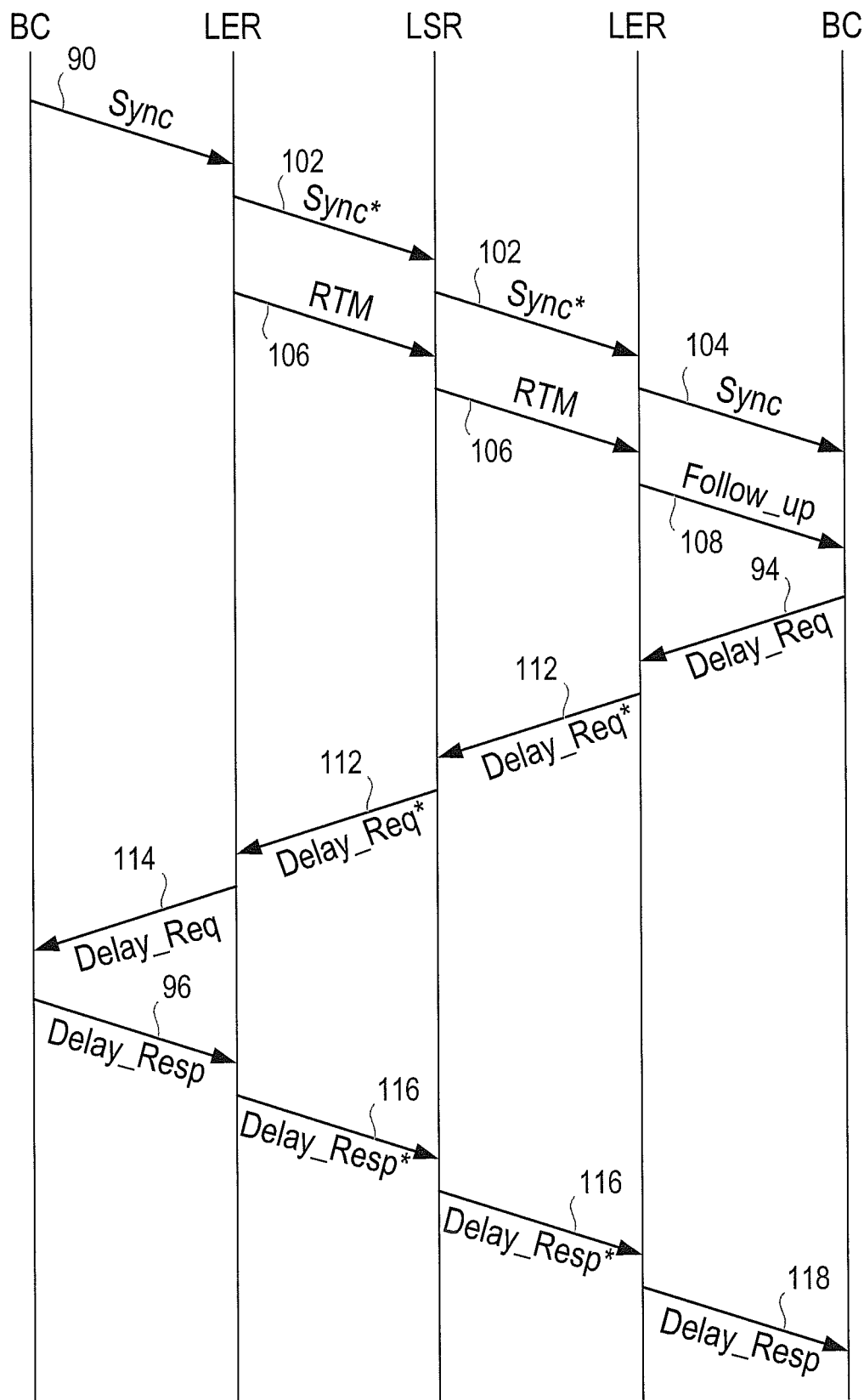
FIG. 5 is a timing diagram illustrating a second method.

FIG. 5 illustrates a method in accordance with a second embodiment.

Specifically, in this illustrated embodiment, the PTP network 10 shown in FIG. 1 is operating in a 1-step mode. That is, a first boundary clock node, such as the boundary clock node 12 shown in FIG. 1, transmits an event PTP message in the form of a Sync message 90, but without sending a Follow_up message.

On receipt of the Sync message 90, a second boundary clock node, such as the boundary clock node 14 shown in FIG. 1, transmits an event PTP message in the form of a Delay_Req message 94.

When it receives the Delay_Req message 94, the first boundary clock node 12 returns a general PTP message, in the form of a Delay_Resp message 96.

On receipt of the Delay_Resp message 96, the second boundary clock node 14 is able to obtain the required information about the transmission delays across the network, and thereby achieve synchronization with the first boundary clock node 12.

Thus, the method allows for synchronization by two-way exchange of packets carrying timing information.

The messages described with reference to FIG. 5 are transmitted across the MPLS network in an MPLS message format, as shown in FIG. 4.

More specifically, in this embodiment, the data packets are transmitted across the MPLS network as a Generalized Associated Channel (G-Ach) message.

In the packet format shown in FIG. 4, the Version field is set to 0, as defined in RFC 4385 [RFC4385]. The Reserved field is set to 0 on transmit and ignored on receipt. The RTM Channel field identifies the packet as such.

The Flags field has one bit, S, which acts as a step flag, indicating if the two-step clock procedure is in use, and therefore set to 0 if the boundary clocks 12, 14 are operating in one-step mode, and set to 1 if they are operating in two-step mode. The PTPType field indicates the type of PTP packet carried in the TLV. Thus, for example, the PTPType field identifies whether the message is a Sync message, Follow_up message, Delay_Req message, or Delay_Resp message. The 10 octet long Port ID field contains the identity of the source port, that is, the specific PTP port of the boundary clock connected to the MPLS network. The Sequence ID is the sequence ID of the PTP message carried in the Value field of the message. Thus, a further packet, containing residence time information relating to an earlier packet, contains information identifying that earlier packet.

The Type field identifies the type of Value that the TLV carries, that is, the kind of field that the message represents. Thus, for example, the Type field can indicate that the message being carried is a message in the format described herein, that is able to carry residence time information. Different Type values may be used to indicate, for example, an authentication type of the carried PTP message. Thus, the type field may indicate that there is no payload, or may indicate that the payload is a PTPv2 message or an NTP message.

The Length field is number of octets of the Value field. The optional Value field may then be used to carry a packet of the time synchronization protocol being used. Thus, the Sync message, Follow_up message, Delay_Req message, or Delay_Resp message may be inserted in the Value field by the respective LER 18, 20 that is connected to the boundary clock node 12, 14 from which the relevant message is being sent.

The packet may be authenticated or encrypted and carried over the MPLS network edge to edge unchanged.

Thus, FIG. 5 shows the Sync message 90 being sent from the boundary clock node 12 to the MPLS ingress Label switching Edge Router (LER) 18. The LER 18 puts the message into the MPLS G-Ach format as shown in FIG. 4, and the resulting packet 102, indicated in FIG. 5 as Sync*, is transmitted through one or more Label Switching Router (LSR) 22, until it reaches the MPLS egress Label switching Edge Router (LER) 20. The LER 20 extracts the message from the MPLS G-Ach format, and the resulting packet 104, corresponding to the original Sync message, is transmitted to the boundary clock node 14.

FIG. 5 also shows that, when the MPLS ingress Label switching Edge Router (LER) 18 receives the Sync message 90 from the boundary clock node 12, it generates an additional message, RTM, 106, for the purpose of carrying residence time information relating to the residence time spent by the Sync message in the various nodes. The LER 18 creates the RTM message 106 in the MPLS G-Ach format as shown in FIG. 4, and the resulting packet is transmitted through one or more Label Switching Router (LSR) 22, until it reaches the MPLS egress Label switching Edge Router (LER) 20.

Thus, when the LER 18 is connected to a node 14 operating in a 1-step mode (no follow up packet which contains timing information for the Sync* packet), the LER 18 generates an additional message to carry residence time information relating to the MPLS network.

Each Label switching Edge Router (LER) 18, 20, and each Label Switching Router (LSR) 22, makes use of the Scratch Pad field of the packet format shown in FIG. 4, to include residence time information.

Specifically, the Scratch Pad field is 8 octets in length and, in the case of the RTM message 106, is used to accumulate the residence time spent in the LERs and LSRs transited by the Sync packet on its path from the ingress LSR 18 to the egress LSR 20.

That is, when the ingress LER 18 transmits the RTM message 106, it includes in the Scratch Pad field a value indicating the residence time spent in the LER 18 by the Sync message 90. The residence time may be measured in any convenient manner, for example from the point in time at which the message starts to be received until the point in time at which the message starts to be transmitted.

The time is stored in IEEE double precision format, with units of nanoseconds.

Similarly, when the LSR 22 transmits the RTM message 106, it updates the Scratch Pad field by adding a value indicating the residence time spent in the LSR 22 by the Sync* message 102.

This continues until the RTM message 106 reaches the MPLS egress LER 20, which extracts the message from the MPLS G-Ach format, and sends a conventional Follow_up message 108 to the boundary clock node 14, containing information indicating the accumulated residence time of the Sync message across the nodes of the network transited by the message, including the egress LER 20 itself. The LER 20 will have previously set the 2-step flag to 1 in the Sync message 104, so that the boundary clock node 14 knows that it can expect the Follow_up message.

Each of the nodes 18, 20, 22 therefore receives a data packet containing the Sync message from a preceding, or source, node, and forwards it to a succeeding, or destination, node, and measures the residence time of the data packet in the respective node. Each of the nodes 18, 20, 22 subsequently sends a further, specially generated, data packet to the succeeding, or destination, node, that includes residence time information derived from the measured residence time.

Thus, the ingress LER achieves the sending of a further data packet containing the residence time information by creating a new (second) data packet, including the residence time information in the new data packet, and sending the new data packet to the destination node. The other nodes achieve the sending of a further data packet containing the residence time information by receiving the (second) data packet created by the ingress LER, including the residence time information in that (second) data packet, and forwarding the new (second) data packet to the destination node. The included residence time information corresponds to the residence time in that node. The including may comprise updating or modifying an existing time (e.g. by adding an additional residence time to a total), or the including may refer to including residence time information initially, where there is no previous residence time in the second data packet.

Thus, each of the nodes 18, 22, 20 acts as a two-step transparent clock.

Thus, when considering the LER 18 as the active node, it receives the Sync message as a first packet from the boundary clock node 12 acting as a source node, and forwards the Sync message to a destination node, for example the LSR 22. (Thus, the term "source node" refers to the node from which the active node receives packets, and the term "destination node" refer to the node to which the active node sends packets. These may not be the original source or the ultimate destination of the packets.) The LER 18 then sends a further packet, namely the RTM message 106 containing residence time information, to the destination node.

When considering the LSR 22 as the active node, it receives the Sync message as a first packet from a source node such as the LER 18, and forwards the Sync message to a destination node, for example the LER 20. It then sends a further packet, namely the RTM message 106 containing residence time information, to the destination node.

Similarly, when considering the LER 20 as the active node, it receives the Sync message as a first packet from a source node such as the LSR 22, and forwards the Sync message to a destination node, for example the boundary clock node 14. It then sends a further packet, namely the Follow_up message 108 containing residence time information, to the destination node.

When the boundary clock node 14 receives the Follow_up message 108, it returns a Delay_Req message, as specified in IEEE 1588. Thus, FIG. 5 shows the Delay_Req message 94 being sent from the boundary clock node 14 to the MPLS Label switching Edge Router (LER) 20. The LER 20 puts the message into the MPLS G-Ach format as shown in FIG. 4, and the resulting packet 112, indicated in FIG. 5 as Delay_Req*, is transmitted through one or more Label Switching Router (LSR) 22, until it reaches the Label switching Edge Router (LER) 18. The LER 18 extracts the message from the MPLS G-Ach format, and the resulting packet 114, corresponding to the original Delay_Req message 94, is transmitted to the boundary clock node 12.

Again as specified in IEEE 1588, the boundary clock node 12 returns a Delay_Resp message 96 when it receives the Delay_Req message 114. Thus, FIG. 5 shows the Delay_Resp message 96 being sent from the boundary clock node 12 to the Label switching Edge Router (LER) 18. Again, the LER 18 puts the message into the MPLS G-Ach format as shown in FIG. 4, and the resulting packet 116, indicated in FIG. 5 as Delay_Resp*, is transmitted through one or more Label Switching Router (LSR) 22, until it reaches the Label switching Edge Router (LER) 20.

The Delay_Resp* packet 116 contains the Delay_Resp message 96 as its payload, but also makes use of the Scratch Pad field of the packet format shown in FIG. 4, to include residence time information of the related Delay_Req message.

Each Label switching Edge Router (LER) 18, 20, and each Label Switching Router (LSR) 22 updates the Delay_Resp* packet 116 to include residence time information. In this case, the residence time information included in the Delay_Resp* packet 116 relates to the residence time spent in the LERs and LSRs by the Delay_Req message 94/112.

That is, in the case of the Delay_Resp* message 116, the Scratch Pad field is used to accumulate the residence time spent in the LERs 18, 20 and the LSR 22 by the related Delay_Req packet on its path from the LER 20 to the LER 18.

In more detail, when the LER 18 generates and transmits the Delay_Resp* message 116, it includes in the Scratch Pad field a value indicating the residence time spent in the LER 18 by the Delay_Req message. As before, the residence time may be measured in any convenient manner, for example from the point in time at which the message starts to be received until the point in time at which the message starts to be transmitted.

The time is stored in IEEE double precision format, with units of nanoseconds.

Similarly, when the LSR 22 transmits the Delay_Resp* message 116, it updates the Scratch Pad field by adding a value indicating the residence time spent in the LSR 22 by the previous, related, Delay_Req message.

This continues until the Delay_Resp* message 116 reaches the LER 20, which extracts the message from the MPLS G-Ach format, and sends a conventional Delay_Resp message 118 to the boundary clock node 14, containing information indicating the accumulated residence time of the Delay-Req message across the nodes of the network transited by the Delay-Req message, including the egress LER 20 itself.

Each of the nodes 18, 20, 22 therefore receives a data packet containing the Delay_Req message from a preceding, or source, node, and forwards it to a succeeding, or destination, node, and measures the residence time of the data packet in the respective node. Each of the nodes 18, 20, 22 subsequently sends a further data packet (i.e. the data packet containing the Delay_Resp message) to the preceding, or source, node, that includes residence time information derived from the measured residence time. Thus, the sending of a further data packet containing the residence time information is achieved by forwarding a second message from the destination to the source, and including the residence time information in that forwarded second message. In this case, the first data packet is the Delay_Req message, and the second (further) data packet is the Delay_Resp message.

Thus, each of the nodes 18, 22, 20 acts as a two-step transparent clock.

Thus, when considering the LER 20 as the active node, it receives the Delay_Req message as a first packet from the boundary clock node 14 acting as a source node, and forwards the Delay_Req message to a destination node, for example the LSR 22. (Thus, the term "source node" refers to the node from which the active node receives packets, and the term "destination node" refer to the node to which the active node sends packets. These may not be the original source or the ultimate destination of the packets.) The LER 20 subsequently sends a further packet, namely the Delay_Resp message 118 containing residence time information, to the source node.

When considering the LSR 22 as the active node, it receives the Delay_Req* message as a first packet from a source node such as the LER 20, and forwards the Delay_Req* message to a destination node, for example the LER 18. It subsequently sends a further packet, namely the Delay_Resp* message 116 containing residence time information, to the source node.

Similarly, when considering the LER 18 as the active node, it receives the Delay_Req* message as a first packet from a source node such as the LSR 22, and forwards the Delay_Req message to a destination node, for example the boundary clock node 12. It subsequently sends a further packet, namely the Delay_Resp* message 116 containing residence time information, to the source node.

FIGS. 3 and 5 therefore illustrate methods in which specific follow-up messages are sent, to include the residence time information relating to the preceding messages. However, it will be appreciated that the same residence time information, relating to the residence time of a packet crossing an MPLS network, can be carried by updating the correction field of one or more following packets. For example, in the case of the Network Time Protocol, this approach is referred to as "interleaved modes", as described at http://www.eecis.udel.edu/~mills/ntp/html/xleave.html.

Examples describing receiving and forwarding the first data packet. In some aspects, one or more modifications may be made to the first data packet in the active node between the packet being received and forwarded, e.g. a modification to the header.

The invention claimed is:

1. A method of operation of a Multiprotocol Label Switching network, the method comprising, in an active node of the network:
   receiving a first data packet from a source node, the first data packet comprising a flag indicating a one-step mode;
   forwarding a corresponding first data packet to a destination node;
   setting the flag in the forwarded first data packet to indicate a two-step mode instead of the one-step mode;
   measuring a residence time of the first data packet in the active node; and
   sending a further data packet containing residence time information of the first data packet, the further data packet being different from the first data packet and the sending the further data packet containing the residence time information comprising:
     creating a new data packet associated with the two-step mode;
     including the residence time information in the new data packet; and
     sending the new data packet including the residence time information to the destination node.

2. The method as claimed in claim 1, wherein the flag is configured to indicate if the two-step mode is being used.

3. The method as claimed in claim 1, wherein the first data packet is sent as part of a method for synchronization by two-way exchange of packets carrying timing information.

4. The method as claimed in claim 1, further comprising including in the further data packet information identifying the first data packet.

5. The method as claimed in claim 1, further comprising:
   receiving a third data packet from the destination node;
   including the residence time information in the third data packet, and
   forwarding the third data packet to the source node.

6. The method as claimed in claim 1, wherein:
   the source node is a clock operating in the one-step mode; and
   wherein the first data packet is sent as part of a method for synchronization, and the synchronization is based on at least one of a timestamp of transmission and receipt of the first data packet.

7. The method as claimed in claim 1, wherein the source node comprises one of a boundary clock and a clock connected to a boundary clock.

8. The method as claimed in claim 1, further comprising updating a correction field in the further data packet to include the residence time information.

9. The method as claimed in claim 1, wherein the further data packet is encapsulated into a Generic Associated Channel packet.

10. A method of operation of a Multiprotocol Label Switching network, the Multiprotocol Label Switching network comprising a plurality of Label Switching Router nodes including a plurality of Label switching Edge Router nodes, the method comprising:
   receiving a Sync data packet from a source node, the Sync data packet comprising a flag indicating a one-step mode;
   transmitting the Sync data packet across the Multiprotocol Label Switching network from an ingress Label switching Edge Router to an egress Label switching Edge Router;
   setting the flag in the transmitted Sync data packet to indicate a two-step mode instead of the one-step mode;
   creating a residence time measurement (RTM) data packet associated with the two-step mode;
   transmitting the RTM data packet across the Multiprotocol Label Switching network from the ingress Label switching Edge Router to the egress Label switching Edge Router;
   measuring a residence time of the Sync data packet at each Label Switching Router node transited by the Sync data packet; and
   including updated residence time information, derived from the measured residence times, when transmitting the RTM data packet from each Label Switching Router node transited by the Sync data packet.

11. The method as claimed in claim 10, further comprising:
transmitting a Delay_Req data packet across the Multi-protocol Label Switching network from the egress Label switching Edge Router to the ingress Label switching Edge Router;
transmitting a Delay_Resp data packet across the Multi-protocol Label Switching network from the ingress Label switching Edge Router to the egress Label switching Edge Router;
measuring a residence time of the Delay_Req data packet at each Label Switching Router node transited by the Delay_Req data packet; and
including updated residence time information, derived from the measured residence times of the Delay_Req data packet, when transmitting the Delay_Resp data packet from each Label Switching Router node transited by the Delay_Req data packet.

12. The method as claimed in claim 10, comprising transmitting the data packets across the Multiprotocol Label Switching network in respective Generalized Associated Channel messages.

13. The method as claimed in claim 10, wherein at the Delay_Req data packet comprises a flag indicating if a two-step mode is being used.

14. A Multiprotocol Label Switching, MPLS, network node, the MPLS network node comprising processing circuitry and being an active node and the processing circuitry causing the MPLS network node to be configured for:
receiving a first data packet from a source node, the first data packet comprising a flag indicating a one-step mode;
forwarding the first data packet to a destination node;
setting the flag in the forwarded first data packet to indicate a two-step mode instead of the one-step mode;
measuring a residence time of the first data packet in the active node; and
sending a further data packet containing residence time information of the first data packet, the further data packet being different from the first data packet and the sending the further data packet containing the residence time information comprising:
creating a new data packet associated with the two-step mode;
including the residence time information in the new data packet; and
sending the new data packet including the residence time information to the destination node.

15. The MPLS network node as claimed in claim 14, wherein the flag is configured to indicate if the two-step mode is being used.

16. The MPLS network node as claimed in claim 14, further configured for including in the further data packet information identifying the first data packet.

17. The MPLS network node as claimed in claim 14, further configured to:
receive a third data packet from the destination node;
forward the third data packet to the source node; and
include the residence time information in the third data packet forwarded to the source node.

18. The MPLS network node as claimed in claim 14, further configured for updating a correction field in the further data packet to include the residence time information.

19. The MPLS network node as claimed in claim 14, wherein the further data packet is encapsulated into a Generic Associated Channel packet.

20. A Multiprotocol Label Switching, MPLS, network node, the MPLS network node being an active node and the MPLS network node comprising:
a processor; and
a memory, the memory containing instructions executable by the processor to configure the node to:
receive a first data packet from a source node, the first data packet comprising a flag indicating a one-step mode;
forward the first data packet to a destination node;
set the flag in the forwarded first data packet to indicate a two-step mode instead of the one step mode;
measure a residence time of the first data packet in the active node; and
send a further data packet containing residence time information of the first data packet, the further data packet being different from the first data packet and the sending the further data packet containing the residence time information comprising:
creating a new data packet associated with the two-step mode;
including the residence time information in the new data packet; and
send the new data packet including the residence time information to the destination node.

* * * * *